UNITED STATES PATENT OFFICE.

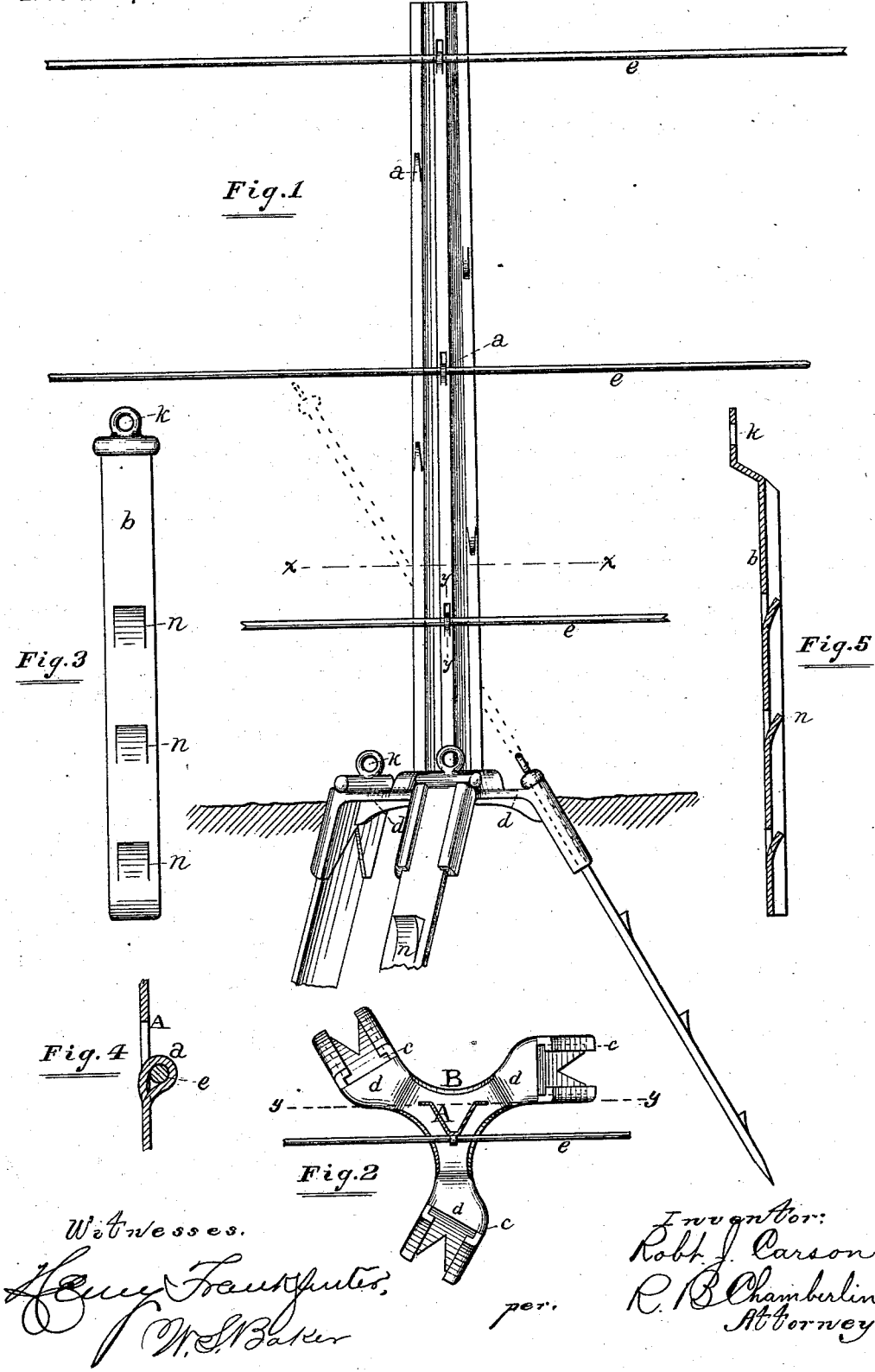

ROBERT J. CARSON, OF CHICAGO, ASSIGNOR OF ONE-HALF TO EDWARD RUTZ, OF SPRINGFIELD, ILLINOIS.

IRON OR STEEL FENCE-POST.

SPECIFICATION forming part of Letters Patent No. 278,220, dated May 22, 1883.

Application filed April 24, 1883. (No model.)

*To all whom it may concern:*

Be it known that I, ROBERT J. CARSON, of Chicago, in the county of Cook and State of Illinois, have invented certain new and useful Improvements in Iron or Steel Fence-Posts; and I do hereby declare the following to be a full, clear, and exact description of the invention, such as will enable others skilled in the art to which it pertains to make and use it, reference being had to the accompanying drawings, which form part of this specification.

My invention relates to an improvement in fence-posts, being particularly designed for the construction of barbed-wire fences; and it consists of a post that is formed from sheet metal, that is secured to a base having radial arms, which arms have at their outer ends downwardly-projecting annular bearing-grooves, in combination with pegs or braces of suitable construction, that are adapted to be driven through the grooves and into the ground for securing the posts thereto, the posts being provided with suitable means for attachment of the barbed wire, as will be more fully described hereinafter.

In the accompanying drawings, Figure 1 is a side elevation of a fence-post with its attachments complete. Fig. 2 is a cross-section on the line X X of Fig. 1. Figs. 3, 4, and 5 are detail views.

A represents a post formed of sheet metal, of any suitable thickness, and which is preferably triangular in cross-section, as shown in Fig. 2. This post is secured in any suitable manner to the base-plate B, which base-plate has projecting from it the radial arms D, the outer ends of which are inclined at a suitable angle downward, and have their inner sides in a line with the adjacent side of the angle formed by the post, as shown at Y Y, Fig. 2. These downwardly-turned projections are provided with a suitable groove, c, which adapts them to receive the pegs b, that are adapted to be driven through them and forced into the ground for securing the post in position. In order to anchor these pegs more firmly in position when driven into the ground, they are provided with barbs n, which may be either stamped out from the pegs, (which are preferably made of flat sheet metal,) or they may be cast thereon, if preferred. The tops of these pegs have secured to them the rings K, through which a crow-bar may be passed to secure leverage when it is desired to draw the pegs from the ground in order to remove the post. In order to secure the barb-wires to the post, I provide the post with ears $a$, which may be stamped therefrom or riveted thereto, and which ears are adapted to be bent over the wire $e$, as shown in Fig. 4.

A fence-post thus constructed is light, and is cheaply made, will be found exceedingly durable, and may easily be removed, after having been put in position, when it is desired to move the fence.

Having thus described my invention, I claim—

1. The combination of a fence-post of suitable construction, a base-plate, B, provided with radial arms $d$, turned-down ends having grooves $c$ formed in them, and pegs $b$, that are adapted to secure the base-plate in position by being driven through the grooves, with which they are provided, into the ground, substantially as described.

2. The combination of the post A, formed of sheet metal, and provided with ears $a$ for securing the wires thereto, a base-plate, B, having radial arms $d$, and the turned-down ends having grooves $c$, these ends being arranged so as to have their inner sides in a line with the adjacent side of the fence-post, and pegs $b$, that are adapted to be driven through the grooves and into the ground for securing the base-plate in position, the said pegs being provided with barbs, substantially as set forth.

In testimony whereof I affix my signature in presence of two witnesses.

ROBERT J. CARSON.

Witnesses:
A. B. TALLMAN,
WILLIAM H. MCGUIRE.